(12) United States Patent
Hung et al.

(10) Patent No.: US 8,502,929 B2
(45) Date of Patent: Aug. 6, 2013

(54) DISPLAY APPARATUS AND METHOD FOR DRIVING THE SAME

(75) Inventors: Chia-Liang Hung, Chu-Nan (TW); Cheng-Yi Chen, Chu-Nan (TW); Chin-Tien Yang, Chu-Nan (TW); Yueh-Jui Li, Chu-Nan (TW)

(73) Assignee: Chimei Innolux Corporation (TW)

( * ) Notice: Subject to any disclaimer, the term of this patent is extended or adjusted under 35 U.S.C. 154(b) by 281 days.

(21) Appl. No.: 12/953,851

(22) Filed: Nov. 24, 2010

(65) Prior Publication Data

US 2011/0157494 A1   Jun. 30, 2011

(30) Foreign Application Priority Data

Dec. 29, 2009 (TW) ................................. 98145646 A

(51) Int. Cl.
*G02F 1/1335* (2006.01)
*G09G 3/36* (2006.01)
*H04N 13/04* (2006.01)

(52) U.S. Cl.
USPC ................. 349/15; 349/69; 345/102; 348/56; 348/58

(58) Field of Classification Search
USPC ................. 349/15, 69; 345/102, 691; 348/56, 348/58
See application file for complete search history.

(56) References Cited

U.S. PATENT DOCUMENTS

| 7,724,211 | B2 | 5/2010 | Slavenburg et al. |
| 2004/0114396 | A1* | 6/2004 | Kobayashi et al. ........... 362/561 |
| 2008/0084519 | A1* | 4/2008 | Brigham et al. ................ 349/65 |
| 2010/0060723 | A1* | 3/2010 | Kimura et al. .................. 348/56 |

FOREIGN PATENT DOCUMENTS

WO   WO 2008056753 A1 *  5/2008

\* cited by examiner

*Primary Examiner* — Michael Caley
(74) *Attorney, Agent, or Firm* — Lowe Hauptman Ham & Berner, LLP

(57) ABSTRACT

A display apparatus and a method of driving the same are provided. The display apparatus includes a backlight module, a liquid crystal panel and a controller. The backlight module has a plurality of light emitting regions capable of emitting light individually. The liquid crystal panel is disposed at a side of the backlight module. The controller is electrically coupled to the backlight module and the liquid crystal panel. When the liquid crystal panel updates a left-eye image to a right-eye image row by row along a column-direction, the controller sequentially turns on and off the light emitting regions along the column-direction, such that a whole region of the liquid crystal panel lighted by light emitting region displays the left-eye image or the right-eye image.

11 Claims, 5 Drawing Sheets

DISPLAY APPARATUS AND METHOD FOR DRIVING THE SAME

CROSS-REFERENCE TO RELATED APPLICATION

This application claims the priority benefit of Taiwan application serial no. 98145646, filed on Dec. 29, 2009. The entirety of the above-mentioned patent application is hereby incorporated by reference herein and made a part of specification.

BACKGROUND

1. Field of the Invention

The invention relates to a display apparatus and a method for driving the same. Particularly, the invention relates to a display apparatus for displaying three-dimensional images and a method for driving the same.

2. Description of Related Art

With progress of science and technology, in the development of display technology, besides features of lightness, slimness, shortness and smallness, display devices are further developed to have a function of displaying three-dimensional (3D) images. Generally, a principle of displaying the 3D image is to respectively transmit two different images into a left eye and a right eye of a user, so that the user's brain can construct the 3D image.

FIG. 1 is a schematic diagram illustrating a conventional 3D display apparatus, and FIG. 2 is a timing diagram of the display apparatus of FIG. 1 when displaying 3D images. Referring to FIG. 1 and FIG. 2, assuming image data sent by a computer 10 can drive a liquid crystal display apparatus (LCD apparatus) 20 to update a mono-eye image per 8.3 ms, a liquid display panel 22 of the LCD apparatus 20 updates a left-eye image within 5.64 ms, as that shown by a timing line marked as "Panel" in FIG. 2. Meanwhile, a backlight module 24 of the LCD apparatus 20 is turned on all the time, as that shown by a timing line marked as "BLU" in FIG. 2. Since an image displayed during an image updating process of the liquid crystal panel 22 is not expected to be viewed by the user, a right lens 32 and a left lens 34 of a pair of glasses 30 are all in an opaque state within such 5.64 ms, so as to avoid the user wearing the glasses 30 viewing the image displayed during the image updating process of the liquid crystal panel 22, as that shown by timing lines marked as "R" and "L" in FIG. 2.

After the liquid crystal panel 22 accomplishes updating the left-eye image, the liquid crystal panel 22 continues to display the updated left-eye image for 2.66 ms. The backlight module 24 is still maintained in the turned-on state to provide light. Moreover, the left lens 34 of the glasses 30 is switched to a light-pervious state within such 2.66 ms, so that the left-eye image displayed by the LCD apparatus 20 can be viewed by the left eye of the user. The right lens 32 of the glasses 30 is still maintained in the opaque state within such 2.66 ms, so as to avoid transmitting the left-eye image displayed by the LCD apparatus 20 to the right eye of the user.

According to a similar procedure as that described above, the liquid crystal panel 22 accomplishes updating a right-eye image during next 5.64 ms, and continues to display the updated right-eye image for 2.66 ms. The backlight module 24 is still maintained in the turned-on state to provide light. The right lens 32 of the glasses 30 is maintained in the opaque state within the next 5.64 ms, and is switched to the light-pervious state within the followed 2.66 ms, so that the updated right-eye image displayed by the LCD apparatus 20 can be viewed by the right eye of the user. The left lens 34 of the glasses 30 is maintained in the opaque state within 8.3 ms, so as to avoid transmitting the right-eye image displayed by the LCD apparatus 20 to the left eye of the user.

According to the above method, based on the phenomenon Persistence of Vision, the user wearing the glasses 30 can view 3D images.

However, according to the above descriptions, it is known that each of the right lens 32 and the left lens 34 is in the light-pervious state for only 2.66 ms every 16.6 ms for transmitting the image. Therefore, when the user views the 3D image displayed by the LCD apparatus 20, the user may feel inadequate image brightness, and a utilization efficiency of the light provided by the backlight module 24 is relatively low. In order to resolve the problem of inadequate image brightness, the brightness of the light provided by the backlight module 24 has to be increased, though it may cause more energy loss and is of no avail for environmental protection. Moreover, if a response speed of liquid crystal molecules is relatively slow, the left lens and the right lens probably have completed switching states before the liquid crystal molecules accomplish image conversion, so that the user may view a previous image, which causes an image sticking phenomenon.

SUMMARY OF THE INVENTION

The invention is directed to a display apparatus, which can resolve problems of inadequate image brightness when displaying a three-dimensional (3D) image and high-energy loss.

The invention is directed to a method for driving a display apparatus, by which problems of inadequate image brightness when displaying a 3D image and high-energy loss can be resolved.

The invention provides a display apparatus including a backlight module, a liquid crystal panel and a controller. The backlight module has a plurality of light-emitting regions capable of emitting light individually. The liquid crystal panel is disposed at a side of the backlight module. The controller is electrically coupled to the backlight module and the liquid crystal panel. When the liquid crystal panel updates a left-eye image to a right-eye image row by row along a column-direction, the controller sequentially turns on and off the light-emitting regions along the column-direction, such that a whole region of the liquid crystal panel lighted by each of the light-emitting regions displays the left-eye image or the right-eye image.

In an embodiment of the invention, the display apparatus further includes a pair of glasses having a left lens and a right lens. When the light-emitting regions lighting the left-eye image are all turned off, the controller controls the right lens to switch from an opaque state to a light-pervious state, and controls the left lens to switch from the light-pervious state to the opaque state. Moreover, the left lens and the right lens are liquid crystal light shutters.

In an embodiment of the invention, the backlight module includes a light box, a diffusion plate and a plurality of light-emitting devices. The light box has a bottom plate and an opening above the bottom plate. The diffusion plate is disposed at the opening of the light box. The light-emitting devices are disposed between the bottom plate and the diffusion plate. Moreover, the backlight module further includes at least one isolation element, which is disposed in the light box and located at a junction of the light-emitting regions for isolating the light-emitting devices of different light-emitting regions.

In an embodiment of the invention, the backlight module includes a plurality of light-guiding plates and a plurality of light-emitting device. The light-guiding plates are arranged one next to another, and each of the light-guiding plates corresponds to one of the light-emitting regions and has at least one light-incident side. The light-emitting devices are disposed at the light-incident sides. Moreover, the backlight module further includes at least one light-shielding element disposed between two adjacent light-guiding plates.

The invention provides a method for driving a display apparatus, which can be described as follows. A liquid crystal panel is driven to update a left-eye image to a right-eye image row by row along a column-direction. A plurality of light-emitting regions of a backlight module is sequentially turned on and off along the column-direction, such that a whole region of the liquid crystal panel lighted by each of the light-emitting regions displays the left-eye image or the right-eye image.

In an embodiment of the invention, when the light-emitting regions lighting the left-eye image are all turned off, a right lens of a pair of glasses is switched from an opaque state to a light-pervious state, and a left lens of the pair of glasses is switched from the light-pervious state to the opaque state.

In an embodiment of the invention, after the left-eye image is completely updated to the right-eye image, the method further includes continually displaying the right-eye image for a predetermined time.

In an embodiment of the invention, a number of the light-emitting regions is n, a frame time of the liquid crystal panel is T, a time occupied by a display region of the liquid crystal panel within one frame time is Ta, a time for waiting liquid crystal molecules to be stable is Tc, a turned-on time length of each of the light-emitting regions is Tt, an overlapping time that adjacent light-emitting regions are all in a turned-on state is To, wherein n, T, Ta, Tc and Tt are positive numbers, and Tt=T−(n−1)×(Ta/n)−Tc and To=Tt−(Ta/n).

Moreover, an x-th light-emitting region is turned on after a signal of a Txs-th scan line is updated when the liquid crystal panel is started to be updated to the right-eye image, the x-th light-emitting region is turned off after a signal of a Txe-th scan line is updated when the liquid crystal panel is started to be updated to the right-eye image, and a proportion that a region of the liquid crystal panel lighted by each of the light-emitting regions covers an area of any adjacent light-emitting region is m %, Txs, Txe and m are positive numbers, and x is a positive integer from 1 to n, and Txs=[(x+m %)×(Ta/n)]+Tc and Txe=Txs+Tt.

In an embodiment of the invention, the method of driving the display apparatus further includes following steps. A last light-emitting region is turned off, and meanwhile the right lens of the pair of glasses is switched from the opaque state to the light-pervious state, and the left lens of the pair of glasses is switched from the light-pervious state to the opaque state. A first light-emitting region is turned on after the last light-emitting region is turned off for a predetermined time.

According to the above descriptions, the display apparatus and the method for driving the same of the invention can increase a turned-on time of the backlight module, so as to increase the image brightness and reduce energy loss.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
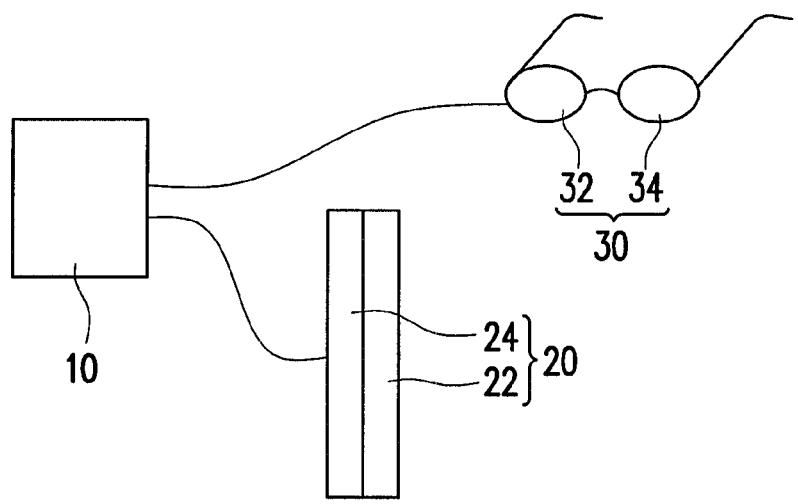
FIG. 1 is a schematic diagram illustrating a conventional 3D display apparatus.
Figure 2:
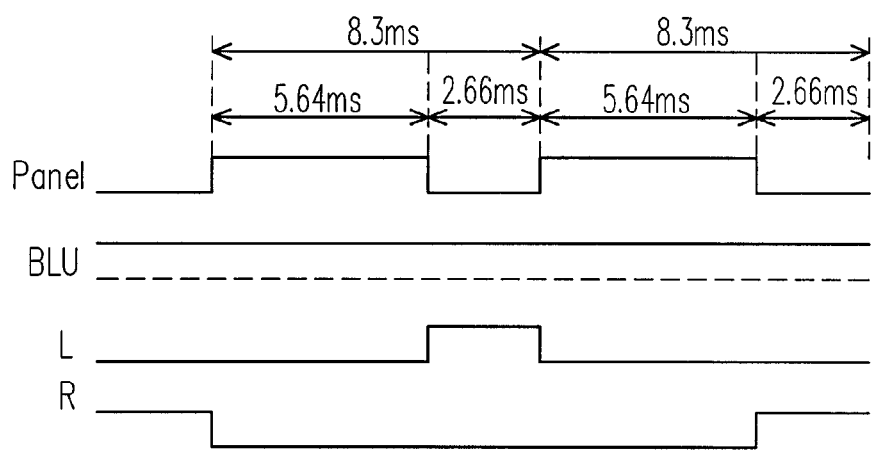
FIG. 2 is a timing diagram of a display apparatus of FIG. 1 when displaying three-dimensional images.
Figure 3:
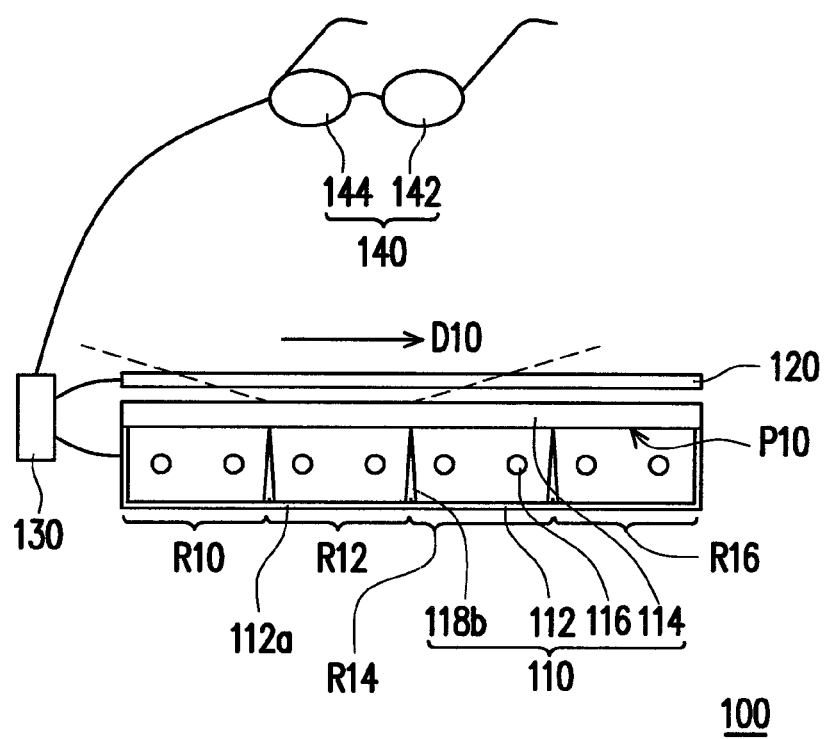
FIG. 3 is a schematic diagram illustrating a display apparatus according to an embodiment of the invention.

FIG. 3 is a schematic diagram illustrating a display apparatus according to an embodiment of the invention. Referring to FIG. 3, the display apparatus 100 of the present embodiment includes a backlight module 110, a liquid crystal panel 120 and a controller 130. The backlight module 110 has a plurality of light-emitting regions R10, R12, R14 and R16 capable of emitting light individually. Namely, when one of the light-emitting regions, for example, R12 is turned on to provide light, another one of the light-emitting regions, for example, R14 can be also in a turned-on state or in a turned-off state, and the light-emitting regions R10, R12, R14 and R15 can be independently turned on/off. The liquid crystal panel 120 is disposed at a side of the backlight module 110. The controller 130 is electrically coupled to the backlight module 110 and the liquid crystal panel 120. The controller 130 can be a control circuit assembled to the backlight module 110 and the liquid crystal panel 120, and the controller 130 can also be a computer or other control circuits of signal sources.

The display apparatus 100 of the present embodiment further includes a pair of glasses 140 having a left lens 144 and a right lens 142. Moreover, the left lens 144 and the right lens 142 are, for example, liquid crystal light shutters, and whether the left lens 144 or the right lens 142 is pervious to light is controlled through electronic control. However, the glasses 140 may also have other designs to achieve the same effect.

Figure 4:
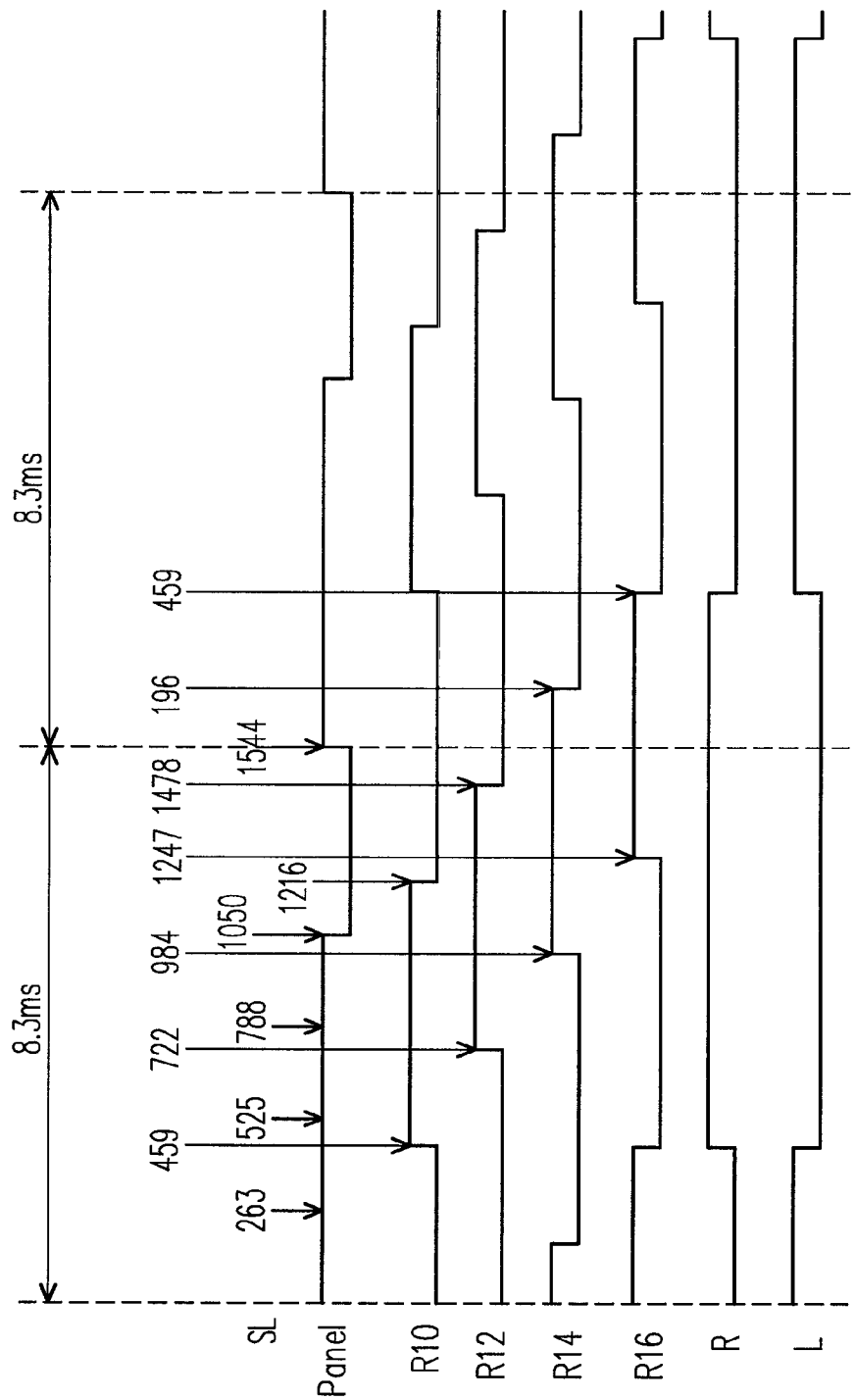
FIG. 4 is a timing diagram of a method for driving a display apparatus according to an embodiment of the invention.

FIG. 4 is a timing diagram of a method for driving a display apparatus according to an embodiment of the invention. The driving method of the present embodiment is, for example, applied to the display apparatus 100 of FIG. 3, though the driving method of the present embodiment is not limited to be only applied to the display apparatus 100 of FIG. 3, and the display apparatus 100 of FIG. 3 is not limited to be driven by the driving method of FIG. 4. Referring to FIG. 3 and FIG. 4, the controller 130 drives the liquid crystal panel 120 to update a left-eye image to a right-eye image row by row along a column-direction D10. Here, assuming the liquid crystal panel 120 updates a left/right-eye image per 8.3 ms, i.e. a frame time is 8.3 ms. The liquid crystal panel 120 totally has pixels of 1050 columns, and after the image is updated, the liquid crystal panel 120 displays the updated image for 2.66 ms (a time required for updating about signals of 494 scan lines), namely, a blanking time is the time required for updating signals of 494 scan lines. Therefore, one frame time is a time required for updating signals of 1544 scan lines. However, the liquid crystal display panel 120 is not limited to continually display the updated image for a predetermined time after the image is updated.

After a signal of 263-th scan line is updated (shown by a timing line marked as "SL" in FIG. 4), the liquid crystal panel 120 right above the light-emitting region R10 updates the left-eye image to the right-eye image row by row. If the light-emitting region R10 only lights the liquid crystal panel 120 right above the light-emitting region R10, the light-emitting region R10 can be turned on. However, in the present embodiment, it is assumed that the light-emitting region R10 lights ¾ area of the liquid crystal panel 120 right above the adjacent light-emitting region R12. Therefore, the light-emitting region R10 has to be turned on after a signal of 459-th scan line is updated, and now the pixels of 1st to 459-th columns on the liquid crystal panel 120 lighted by the light-emitting region R10 are all updated to the right-eye image. Meanwhile, the light-emitting region R16 lighting a region of the liquid crystal panel 120 that still displays the left-eye image is turned off. Moreover, the controller 130 controls the right lens 142 to switch from the opaque state to the light-pervious state, and controls the left lens 144 to switch from the light-pervious state to the opaque state. According to the above operations, a right eye of a user can view the updated right-eye image displayed on the region of the liquid crystal panel 120 lighted by the light-emitting region R10 through the right lens 142, and a left eye of the user cannot view any image, temporarily.

Moreover, if a response speed of liquid crystal molecules is relatively slow, when the light-emitting region R10 is immediately turned on after the signal of 459-th scan line is updated, the pixel near the 459-th column is probably still not updated to the right-eye image, which may cause that the right eye of the user views a sticking image of the left-eye image. When the above situation occurs, a voltage difference higher than a voltage difference corresponding to a gray level to be displayed by each of the pixels can be used to drive the pixel, and then the voltage difference corresponding to the gray level to be displayed by each of the pixels is used to drive the pixel. For example, if a voltage difference corresponding to a gray level to be displayed by a certain pixel is 1 volt, a voltage difference of 3 volts can be used to drive the pixel, so as to quickly rotate the liquid crystal molecules. After the liquid crystal molecules start to rotate, the voltage difference of 1 volt is used to drive the pixel in order to display the correct gray level. In this way, the response speed of the liquid crystal molecules can be increased, so as to avoid the user viewing the sticking image.

Similarly, if the left lens 144 and the right lens 142 are, for example, liquid crystal light shutters, the problem that the user views the sticking image due to the slow response speed of the liquid crystal molecules also exists. To resolve such problem, when the last light-emitting region R16 of the backlight module 110 is turned off, the right lens 142 is switched from the opaque state to the light-pervious state, and the left lens 144 is switched from the light-pervious state to the opaque state. However, the first light-emitting region R10 is not turned on now, so as to avoid the left eye of the user still viewing the right-eye image lighted by the light-emitting region R10 due to the slow response speed of the liquid crystal molecules, and accordingly avoid a situation that the right eye of the user cannot correctly view the right-eye image lighted by the light-emitting region R10 due to the slow response speed of the liquid crystal molecules. Then, all of the light-emitting regions R10, R12, R14 and R16 are maintained in the turned-off state for a predetermined time, so as to ensure that the right lens 142 is switched from the opaque state to the light-pervious state, and the left lens 144 is switched from the light-pervious state to the opaque state. A length of the predetermined time is determined according to a length of the response time required by the liquid crystal molecules of the left lens 144 and the right lens 142. After the predetermined time is ended, the first light-emitting region R10 is turned on, so as to ensure that the left eye of the user cannot view the right-eye image lighted by the light-emitting region R10, and ensure that the right-eye of the user can correctly view the right-eye image lighted by the light-emitting region R10.

After a signal of 525-th scan line is updated, the liquid crystal panel 120 right above the light-emitting region R12 also completes updating the left-eye image to the right-eye image. However, in the present embodiment, it is assumed that the light-emitting region R12 lights ¾ areas of the liquid crystal panel 120 right above the adjacent light-emitting regions R10 and R14. Therefore, the light-emitting region R12 has to be turned on after a signal of 722-th scan line is updated, and now the region on the liquid crystal panel 120 lighted by the light-emitting region R12 is all updated to the right-eye image. Therefore, the right eye of the user can view the updated right-eye image displayed on the region of the liquid crystal panel 120 lighted by the light-emitting regions R10 and R12 through the right lens 142, and the left eye of the user still cannot view any image.

After a signal of 984-th scan line is updated, the light-emitting region R14 is turned on, and now the region on the liquid crystal panel 120 lighted by the light-emitting region R14 is all updated to the right-eye image. Therefore, the right eye of the user can view the updated right-eye image displayed on the region of the liquid crystal panel 120 lighted by the light-emitting regions R10, R12 and R14 through the right lens 142, and the left eye of the user still cannot view any image.

After a signal of 1050-th scan line is updated, all of the regions of the liquid crystal panel 120 are updated to the right-eye image. However, in order to balance a turned-on time length of each of the light-emitting regions R10, R12, R14 and R16, the light-emitting region R10 is turned off after a signal of 1216-th scan line is updated, and the light-emitting region R16 is turned on after a signal of 1247-th scan line is updated. In other words, the turned-on time length of each of the light-emitting regions R10, R12, R14 and R16 is a time required for updating about signals of 757 scan lines. Therefore, the light-emitting region R14 can be turned off after a signal of 196-th scan line is updated after a next left-eye image is started to be updated, and the light-emitting region R16 can be turned off after the signal of 459-th scan line is updated after the next left-eye image is started to be updated, so as to turn on the light-emitting region R10 to light the next left-eye image, and meanwhile the left lens 144 is switched from the opaque state to the light-pervious sate, and the right lens 142 is switched from the light-pervious state to the opaque state. By repeating the above operations, the user wearing the glasses 140 can view three-dimensional (3D) images based on the Persistence of Vision.

According to the above descriptions, it is known that in the display apparatus 100 of the present embodiment and the method for driving the same, since the backlight module 110 has a plurality of the light-emitting regions R10, R12, R14 and R16 capable of emitting light individually, the light-emitting regions lighting image-updated regions can be sequentially turned on, and the corresponding lens of the glasses 140 is switched to the light-pervious state to transmit the image without waiting to complete updating the whole image. Therefore, a switching frequency of the glasses 140 is reduced, so as to reduce detritions of the glasses 140. Moreover, since the time of maintaining the lenses of the glasses 140 in the light-pervious state is greatly increased, brightness of the image viewed by the user is greatly increased, and light utilization efficiency of the backlight module 110 is also greatly improved.

A method of determining a time point of each driving step of the aforementioned driving method is described below. It is assumed that a number of the light-emitting regions is n, a frame time of the liquid crystal panel 120 is T, a time occupied by a display region of the liquid crystal panel 120 within one frame time is Ta, a time for waiting liquid crystal molecules to be stable is Tc, a turned-on time length of each of the light-emitting regions is Tt, an overlapping time that adjacent light-emitting regions are all in the turned-on state is To, an x-th light-emitting region is turned on after a signal of Txs-th scan line is updated when the liquid crystal panel 120 is started to be updated to the right-eye image, the x-th light-emitting region is turned off after a signal of Txe-th scan line is updated when the liquid crystal panel is started to be updated to the right-eye image, and a proportion that a region of the liquid crystal panel 120 lighted by each of the light-emitting regions covers an area of any adjacent light-emitting region is m %, wherein n, Ta, Tt, Txs, Txe and m are positive numbers, and x is a positive integer from 1 to n.

$$Tt=T-(n-1)\times(Ta/n)-Tc, \text{ and } To=Tt-(Ta/n).$$

In the present embodiment, Txs=[(x−m %)×(Ta/n)]+Tc, and Txe=Txs+Tt.

Moreover, n=4, T=8.3 ms, Tc=0 ms, Ta=5.64 ms, so that Tt=4.07 ms, which is equivalent to a time required for updating about 757 scan lines, and To=2.66 ms. In the present embodiment, m=75, so that T1s=2.47 ms, which is equivalent to a time required for updating about 459 scan lines, T2s=3.88 ms, which is equivalent to a time required for updating about 722 scan lines, T3s=5.29 ms, which is equivalent to a time required for updating about 984 scan lines, T4s=6.70 ms, which is equivalent to a time required for updating about 1247 scan lines. T1e=6.54 ms, which is equivalent to a time required for updating about 1216 scan lines, T2e=7.95 ms, which is equivalent to a time required for updating about 1479 scan lines, T3e=9.36, which is equivalent to a time required for updating about 1741 scan lines, T4e=10.77, which is equivalent to a time required for updating about 2004 scan lines. Numbers of the scan lines corresponding to Txe are all counted from when the liquid crystal panel 120 is started to be updated to the right-eye image, though the scan lines of T3e and T4e in FIG. 4 are counted from when the liquid crystal panel 120 is started to be updated to the next left-eye image.

Referring to FIG. 3, the backlight module 110 of the present embodiment includes a light box 112, a diffusion plate 114 and a plurality of light-emitting devices 116. The light box 112 has a bottom plate 112a and an opening P10 above the bottom plate 112a. The diffusion plate 114 is disposed at the opening P10 of the light box 112. The light-emitting devices 116 are disposed between the bottom plate 112a and the diffusion plate 114. The light-emitting devices 116 are, for example, cold cathode fluorescent lamps (CCFLs), though the light-emitting devices 116 can also be light-emitting diodes or other light-emitting devices. Moreover, a number of the light-emitting devices 116 in each of the light-emitting regions R10, R12, R14 and R16 can be one or plural.

Moreover, the backlight module 110 may further include at least one isolation element 118b (a number thereof is plural therein). The isolation elements 118b are disposed in the light box 112 and are located at lower parts of junctions of the light-emitting regions R10, R12, R14 and R16 for isolating the light-emitting devices 116 of different light-emitting regions R10, R12, R14 and R16. Since light cannot pass through the isolation elements 118b, when the light-emitting devices 116 in each of the light-emitting regions R10, R12, R14 and R16 emit light, the light is roughly confined to emit from the diffusion plate 114 right above each of the light-emitting regions R10, R12, R14 and R16. A height of the isolation element 118b can be adjusted to control the proportion of the adjacent light-emitting region lighted by each of the light-emitting region.

Figure 5:
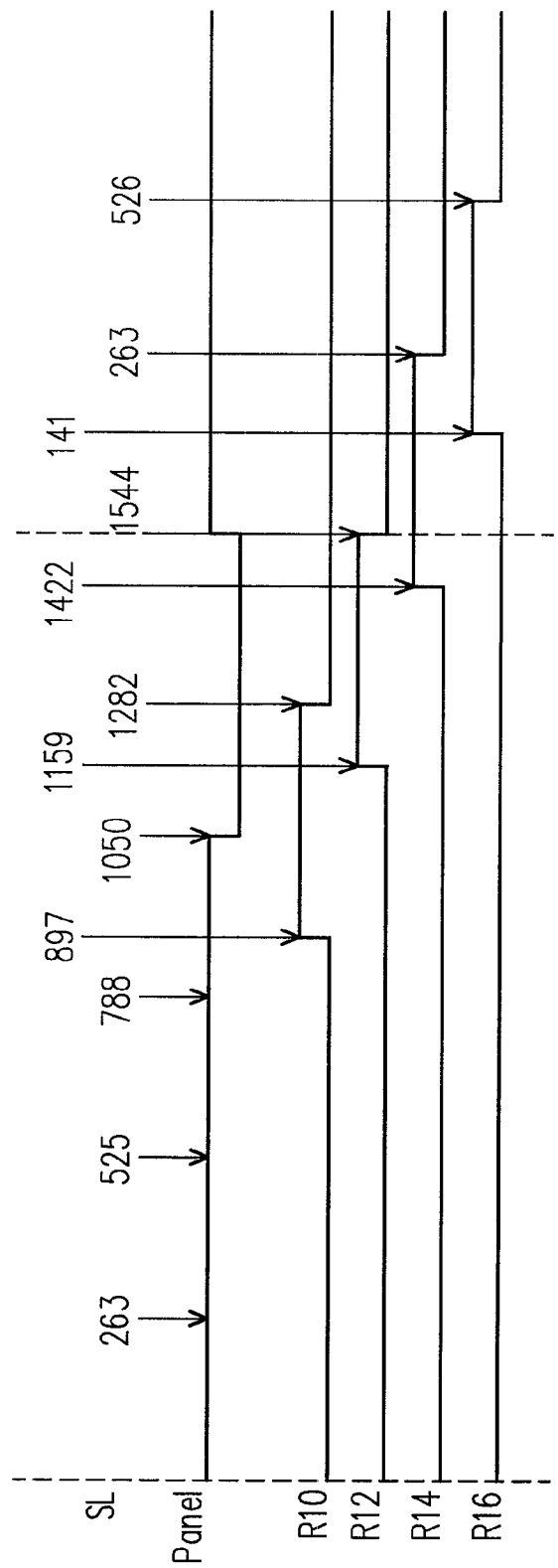
FIG. 5 is a timing diagram of a method for driving a display apparatus according to another embodiment of the invention.

FIG. 5 is a timing diagram of a method for driving the display apparatus according to another embodiment of the invention. In FIG. 5, only driving timing of the liquid crystal panel and the backlight module is illustrated, and a driving method of the glasses is similar to that of FIG. 4, by which the light-pervious states of the left lens and the right lens are switched as the first light-emitting region is turned on. Here, only differences of the present embodiment and the previous embodiment are introduced. In the present embodiment, Txs=[(x+m %)×(Ta/n)]+Tc and Txe=Txs+Tt. n=4, T=8.3 ms, Tc=2 ms, Ta=5.64 ms, m=100, so that Tt=2.07 ms, which is equivalent to a time required for updating about 385 scan lines, and To=0.66 ms. Therefore, T1s=4.82 ms, which is equivalent to a time required for updating about 897 scan lines, T2s=6.23 ms, which is equivalent to a time required for updating about 1159 scan lines, T3s=7.64 ms, which is equivalent to a time required for updating about 1422 scan lines, T4s=9.05 ms, which is equivalent to a time required for updating about 1685 scan lines, i.e. the time required for updating about 141 scan lines from when the liquid crystal panel 120 is started to be updated to the next left-eye image. T1e=6.89 ms, which is equivalent to a time required for updating about 1282 scan lines, T2e=8.3 ms, which is equivalent to a time required for updating about 1544 scan lines, T3e=9.71, which is equivalent to a time required for updating about 1807 scan lines, i.e. the time required for updating about 263 scan lines from when the liquid crystal panel 120 is started to be updated to the next left-eye image, T4e=11.12, which is equivalent to a time required for updating about 2070 scan lines, i.e. the time required for updating about 526 scan lines from when the liquid crystal panel 120 is started to be updated to the next left-eye image.

Moreover, according to FIG. 5, it is known that a time period from a time point that the first scan line is driven to a time point that the light-emitting region R10 is turned on is about 4.82 ms, and a time period from a time point that the most right 525-th scan line capable of being lighted by the light-emitting region R10 is driven to a time point that the light-emitting region R10 is turned on is about 2.82 ms, and a time for waiting liquid crystal molecules to be stable is 2 ms. Since the response time of the liquid crystal molecules driven by the scan lines of different positions is different, high driving voltages of different magnitudes can be input according to the positions of the scan lines. The shorter the response time of the pixel is, the greater the high driving voltage is input to the corresponding scan line, and the longer the response time of the pixel is, the smaller the high driving voltage is input to the corresponding scan line. In this way, the response speed of the liquid crystal molecules is increased, so as to reduce the time for waiting the liquid crystal molecules to be stable. Moreover, the scan lines can be grouped into a plurality of groups according to different positions thereof, and the same high driving voltage can be input to each of the groups without inputting different high driving voltages to each of the scan lines.

Figure 6:
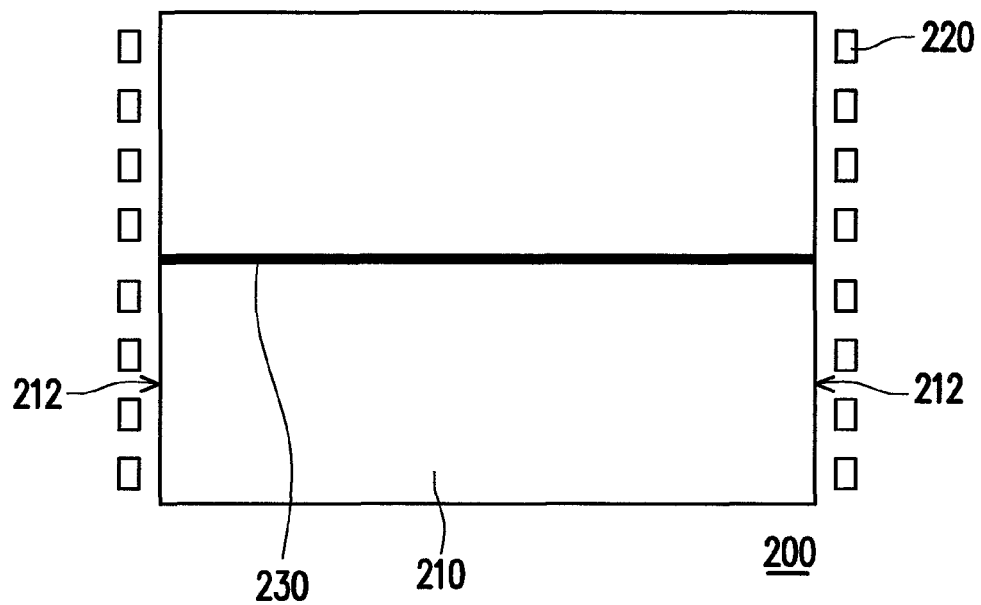
FIG. 6 is a schematic diagram illustrating a backlight module of a display apparatus according to another embodiment of the invention.

FIG. 6 is a schematic diagram illustrating a backlight module of a display apparatus according to another embodiment of the invention. Referring to FIG. 6, the backlight module 200 of the present embodiment includes a plurality of light-guiding plates 210 and a plurality of light-emitting devices 220. The light-guiding plates 210 are arranged one next to another. When the backlight module 200 is applied to the display apparatus of FIG. 3, each of the light-guiding plates 210 corresponds to one light-emitting region. In other words, a number of the light-emitting regions of the backlight module of the display apparatus are not limited to four, which can also be two, three or other numbers greater than one. Each of the light-guiding plates 210 has at least one light-incident side 212, and in the present embodiment, two light-incident sides 212 are taken as an example. The light-emitting devices 220 are disposed at the light-incident sides 212, and the light-emitting devices 220 are, for example, light-emitting diodes, though the light-emitting devices 220 can also be CCFLs or other light-emitting devices. Moreover, the backlight module 200 may further include at least one light-shielding element 230 disposed between two adjacent light-guiding plates 210.

Figure 7:
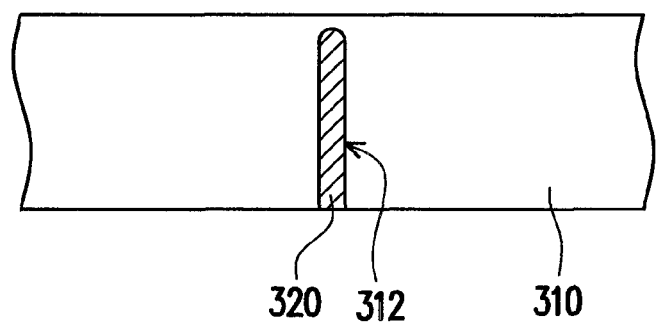
FIG. 7 is a partial cross-sectional view of a light-guiding plate of a backlight module of a display apparatus according to still another embodiment of the invention.

FIG. 7 is a partial cross-sectional view of a light-guiding plate of a backlight module of a display apparatus according to still another embodiment of the invention. Referring to FIG. 7, the light-guiding plate 310 of the present embodiment can be used to replace the light-guiding plates 210 of FIG. 6. Differences between the light-guiding plate 310 and the light-guiding plates 210 of FIG. 6 are that the light-guiding plate 310 is a single device, and a slit 312 is formed on a surface of the light-guiding plate 310. The slit 312 can prevent light transmitted in the light-guiding plate 310 at one side of the slit 312 from entering another side, so that a function of the slit 312 is equivalent to the junction between the light-guiding plates 210 of FIG. 6. Moreover, a light-shielding element 320 can also be disposed in the slit 312. In addition, similar design can also be used to replace the diffusion plates 114 of FIG. 3.

In summary, according to the display apparatus of the invention and the method for driving the same, the backlight module has a plurality of light-emitting regions capable of emitting light individually. Therefore, the turned-on time of each lens of the glasses worn by the user can be increased, so that brightness of the 3D image viewed by the user is increased. Meanwhile, utilization efficiency of light provided by the backlight module can be increased without increasing brightness of light, so that energy loss is reduced which avails the environmental protection.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display apparatus, comprising:
   a backlight module, having a plurality of light-emitting regions capable of emitting light individually; a liquid crystal panel, disposed at a side of the backlight module; and
   a controller, electrically coupled to the backlight module and the liquid crystal panel, wherein when the liquid crystal panel updates a left-eye image to a right-eye image row by row along a column-direction, the controller sequentially turns on and off the light-emitting regions along the column-direction, such that a whole region of the liquid crystal panel lighted by each of the light-emitting regions displays the left-eye image or the right-eye image, a number of the light-emitting regions is n, a frame time of the liquid crystal panel is T, a time occupied by a display region of the liquid crystal panel within one frame time is Ta, a time for waiting liquid crystal molecules to be stable is Tc, a turned-on time length of each of the light-emitting regions is Tt, an overlapping time that adjacent light-emitting regions are all in a turned-on state is To, wherein n, T, Tc, Ta, Tt and To are positive numbers, and Tt=T−(n−1)*(Ta/n)−Tc, and To=Tt−(Ta/n), an x-th light-emitting region is turned on after a signal of a Txs-th scan line is updated when the liquid crystal panel is started to be updated to the right-eye image, the x-th light-emitting region is turned off after a signal of a Txe-th scan line is updated when the liquid crystal panel is started to be updated to the right-eye image, and a proportion that a region of the liquid crystal panel lighted by each of the light-emitting regions covers an area of any adjacent light-emitting region is m %, Txs, Txe and m are positive numbers, and x is a positive integer from 1 to n, and Txs=[(x+m %)*(Ta/n)]+Tc, and Txe=Txs+Tt.

2. The display apparatus as claimed in claim 1, further comprising a pair of glasses having a left lens and a right lens, wherein when the light-emitting regions lighting the left-eye image are all turned off, the controller controls the right lens to switch from an opaque state to a light-pervious state, and controls the left lens to switch from the light-pervious state to the opaque state.

3. The display apparatus as claimed in claim 2, wherein the left lens and the right lens are liquid crystal light shutters.

4. The display apparatus as claimed in claim 1, wherein the backlight module comprises: a light box, having a bottom plate and an opening above the bottom plate; a diffusion plate, disposed at the opening of the light box; and a plurality of light-emitting devices, disposed between the bottom plate and the diffusion plate.

5. The display apparatus as claimed in claim 4, wherein the backlight module further comprises at least one isolation element disposed in the light box and located at a junction of the light-emitting regions for isolating the light-emitting devices of different light-emitting regions.

6. The display apparatus as claimed in claim 1, wherein the backlight module comprises: a plurality of light-guiding plates, arranged one next to another, and each of the light-guiding plates corresponding to one of the light-emitting regions and having at least one light-incident side; and a plurality of light-emitting device, disposed at the light-incident sides.

7. The display apparatus as claimed in claim 6, wherein the backlight module further comprises at least one light-shielding element disposed between two adjacent light-guiding plates.

8. A method for driving a display apparatus, comprising: driving a liquid crystal panel to update a left-eye image to a right-eye image row by row along a column-direction; and sequentially turning on and off a plurality of light-emitting regions of a backlight module along the column-direction, such that a whole region of the liquid crystal panel lighted by each of the light-emitting regions displays the left-eye image or the right-eye image, a number of the light-emitting regions is n, a frame time of the liquid crystal panel is T, a time occupied by a display region of the liquid crystal panel within one frame time is Ta, a time for waiting liquid crystal molecules to be stable is Tc, a turned-on time length of each of the light-emitting regions is Tt, an overlapping time that adjacent light-emitting regions are all in a turned-on state is To, wherein n, T, Tc, Ta, Tt and To are positive numbers, and $Tt=T-(n-1)*(Ta/n)-Tc$, and $To=Tt-(Ta/n)$, an x-th light-emitting region is turned on after a signal of a Txs-th scan line is updated when the liquid crystal panel is started to be updated to the right-eye image, the x-th light-emitting region is turned off after a signal of a Txe-th scan line is updated when the liquid crystal panel is started to be updated to the right-eye image, and a proportion that a region of the liquid crystal panel lighted by each of the light-emitting regions covers an area of any adjacent light-emitting region is m %, Txs, Txe and m are positive numbers, and x is a positive integer from 1 to n, and $Txs=[(x+m \%)*(Ta/n)]+Tc$, and $Txe=Txs+Tt$.

9. The method for driving the display apparatus as claimed in claim 8, further comprising switching a right lens of a pair of glasses from an opaque state to a light-pervious state, and switching a left lens of the pair of glasses from the light-pervious state to the opaque state when the light-emitting regions lighting the left-eye image are all turned off.

10. The method for driving the display apparatus as claimed in claim 8, further comprising continually displaying the right-eye image for a predetermined time after the left-eye image is completely updated to the right-eye image.

11. The method for driving the display apparatus as claimed in claim 8, further comprising: turning off a last light-emitting region, and meanwhile switching a right lens of a pair of glasses from the opaque state to the light-pervious state, and switching a left lens of the pair of glasses from the light-pervious state to the opaque state; and turning on a first light-emitting region after the last light-emitting region is turned off for a predetermined time.

* * * * *